(12) United States Patent
Stelter et al.

(10) Patent No.: US 8,282,753 B2
(45) Date of Patent: Oct. 9, 2012

(54) ARTICLES AND METHODS OF MASKING OR PROTECTING A SUBSTRATE

(75) Inventors: John D. Stelter, St. Joseph Township, WI (US); Troy K. Ista, River Falls, WI (US); Thomas J. Reid, White Bear Lake, MN (US); Patrick J. Hager, Woodbury, MN (US); Kevin M. Eliason, River Falls, WI (US)

(73) Assignee: 3M Innovative Properties Company

( * ) Notice: Subject to any disclaimer, the term of this patent is extended or adjusted under 35 U.S.C. 154(b) by 0 days.

(21) Appl. No.: 13/334,430

(22) Filed: Dec. 22, 2011

(65) Prior Publication Data
US 2012/0090780 A1   Apr. 19, 2012

Related U.S. Application Data

(62) Division of application No. 12/249,618, filed on Oct. 10, 2008, now Pat. No. 8,105,450.

(60) Provisional application No. 60/979,001, filed on Oct. 10, 2007.

(51) Int. Cl.
| | |
|---|---|
| B29C 65/00 | (2006.01) |
| B31B 1/60 | (2006.01) |
| B32B 37/00 | (2006.01) |
| A41H 37/00 | (2006.01) |
| A44B 19/00 | (2006.01) |
| B32B 9/00 | (2006.01) |
| B32B 33/00 | (2006.01) |
| B32B 7/12 | (2006.01) |
| B32B 15/04 | (2006.01) |
| B32B 27/04 | (2006.01) |
| B32B 27/12 | (2006.01) |
| D04H 1/00 | (2006.01) |
| D04H 3/00 | (2012.01) |
| D04H 5/00 | (2012.01) |
| D04H 13/00 | (2006.01) |

(52) U.S. Cl. ............ 156/60; 156/66; 428/40.1; 428/352; 428/354; 442/151; 442/327

(58) Field of Classification Search .................... 156/60, 156/66; 428/40.1, 352, 354; 442/151, 327
See application file for complete search history.

(56) References Cited

U.S. PATENT DOCUMENTS
2,532,011 A   11/1950   Dahlquist et al.
(Continued)

FOREIGN PATENT DOCUMENTS
EP   1097975 A   5/2001
(Continued)

OTHER PUBLICATIONS

PCT/US2008/079579 International Search Report, Jan. 12, 2009, 4 pgs.

*Primary Examiner* — Christopher Schatz
*Assistant Examiner* — Matthew Hoover
(74) *Attorney, Agent, or Firm* — Philip P. Soo (57) ABSTRACT

A protection sheet and method of protecting a substrate is disclosed. In an embodiment, the protection sheet comprises an adhesive coated nonwoven material. In an embodiment a surface of the protection sheet captures and retains paint overspray, dust, dirt and other contaminants so as to provide a cleaner paint job. In an embodiment the protection sheet may be laminated to a second nonwoven or woven material to allow clean removal after extended use. The protection sheet may be used to protect horizontal or vertical substrates, and is particularly suited to protect the surfaces of a paint booth used in automotive spray-painting operations.

19 Claims, 5 Drawing Sheets

U.S. PATENT DOCUMENTS

| | | |
|---|---|---|
| 2,875,680 A | 2/1956 | Forshee |
| 3,121,021 A | 2/1964 | Copeland |
| 3,403,862 A | 10/1968 | Dworjanyn |
| 3,485,706 A | 12/1969 | Evans |
| 3,700,521 A | 10/1972 | Gaffney |
| 3,723,218 A | 3/1973 | Gaffney |
| 3,767,353 A | 10/1973 | Gaffney |
| 4,077,410 A | 3/1978 | Butterworth et al. |
| 4,123,491 A | 10/1978 | Larsen |
| 4,199,646 A * | 4/1980 | Hori et al. .................. 428/344 |
| 4,728,571 A | 3/1988 | Clemens et al. |
| 4,738,894 A | 4/1988 | Borde |
| 4,973,513 A | 11/1990 | Riedel |
| 4,990,399 A | 2/1991 | Hoopengardner |
| 5,162,150 A | 11/1992 | Buis et al. |
| 5,187,005 A | 2/1993 | Stable et al. |
| 5,496,605 A | 3/1996 | Augst et al. |
| 5,616,387 A | 4/1997 | Augst et al. |
| 5,681,654 A | 10/1997 | Mamish |
| 5,804,610 A | 9/1998 | Hamer et al. |
| 5,902,654 A | 5/1999 | Davidson et al. |
| 6,004,308 A | 12/1999 | Haddock |
| 6,294,249 B1 | 9/2001 | Hamer et al. |
| 6,410,464 B1 * | 6/2002 | Menzies et al. ............... 442/151 |
| 6,457,200 B1 | 10/2002 | Tanaka et al. |
| 6,928,794 B2 | 8/2005 | Hamer et al. |
| 2002/0122936 A1 | 9/2002 | Nickel |
| 2002/0151240 A1 * | 10/2002 | Smith et al. .................... 442/327 |
| 2005/0084647 A1 | 4/2005 | Menzies et al. |
| 2005/0223650 A1 | 10/2005 | Blake et al. |
| 2006/0000541 A1 | 1/2006 | Hager et al. |
| 2009/0095400 A1 | 4/2009 | Stelter |

FOREIGN PATENT DOCUMENTS

| | | |
|---|---|---|
| EP | 1149883 A | 10/2001 |
| GB | 1357354 | 6/1974 |
| WO | WO 97/27241 | 7/1997 |
| WO | WO 00/20201 | 4/2000 |

* cited by examiner

ARTICLES AND METHODS OF MASKING OR PROTECTING A SUBSTRATE

RELATED APPLICATION DATA

This application is a divisional of U.S. Ser. No. 12/249,618, filed Oct. 10, 2008, now U.S. Pat. No. 8,105,450 allowed, which claims the benefit of U.S. Provisional Application Ser. No. 60/979,001, filed Oct. 10, 2007.

FIELD

The present disclosure relates to methods of masking or protecting a substrate as well as articles used for protecting or masking a substrate. More specifically, this disclosure relates to articles and methods of protecting or masking a substrate for paint spraying operations.

BACKGROUND

In collision repair facilities, painting operations are often carried out in paint booths. A paint booth is an enclosed structure capable of being heated to very high temperatures, and it typically contains interior surfaces made of coated metal or other heat resistant materials. Painting operations are conducted in paint booths in order to contain paint overspray produced during the painting operation as well as to provide a controlled environment for curing paint finishes. During painting operations, paint booth surfaces are often contaminated with paint overspray, making the interior surfaces of the paint booth difficult and time consuming to clean.

The accumulation of dried paint particles known as "paint dust" can also cause defects in freshly painted surfaces by being dislodged from the walls of the paint booth and depositing onto freshly painted surfaces. After heat curing of the paint finish, the embedded paint dust particles must be removed mechanically by sanding and finishing, adding cost and time to the painting process. In addition, cleaning the unprotected walls of a paint booth can require some level of restoration and refinishing of the walls, often taking a day or more to accomplish, and resulting in significant booth downtime.

The accumulation of paint overspray on paint booth interior surfaces also diminishes the quality and intensity of ambient light available to the painter. The lack of bright, white interior surfaces causes difficulties for the painter in accurately discerning and matching discerning paint colors, potentially leading to painting mistakes which require costly rework.

Various materials means have been employed in an attempt to protect paint booth surfaces. A disadvantage of these materials means is that they have generally been difficult and time consuming to apply. These prior art means have also struggled to provide sufficient paint overspray and paint dust capture while adequately enduring the harsh baking environment of the paint booth. Paint booth surface coatings and coverings must endure repeated bake cycles at temperatures up to and in excess of 180° F., yet still be readily removable and replaceable.

Adhesive coated plastic sheets have been employed to cover paint booth surfaces. These plastic sheets are difficult to install and the installation results in many wrinkles which tend to collect and hold paint overspray and other contaminants that in turn are easily dislodged during painting. As previously described, these dislodged particulates can cause paint dust and lead to defects in the paint coating. In addition, the adhesive bond of the plastic sheets to the booth surfaces builds with time and through repeated bake cycles, making the construction difficult or impossible to remove cleanly without slivering of the film or without adhesive residue. Such materials are also prone to puncture, tear, and wrinkling in more demanding environments.

Other masking articles have similarly suffered. For example, masking papers have been employed, and while stiff and somewhat easier to handle than plastic sheets, they lack flexibility and extensibility to easily fit over or around protrusions or obstacles. Paper is also subject to tearing which produces small fibers that can contribute to contamination.

Sprayable polymeric coatings are another material that has been employed to cover paint booth surfaces. However, under repeated baking cycles the solubility of these coatings decrease, complicating the removal process. In addition, washable coatings present environmental concerns if the washings are discarded into common drains or municipal waste water systems.

SUMMARY

The present disclosure is directed to methods and articles for masking or protecting a substrate. In an embodiment, a protection sheet is described, the protection sheet comprising:

(a) a nonwoven material having opposing first and second major surfaces;

(b) a pressure sensitive adhesive, disposed on the second major surface of the nonwoven material; and (c) a scrim material in contact with at least a portion of the pressure sensitive adhesive.

In further embodiments, a method of protecting a substrate is described, the method comprising:

(a) providing at least one protection sheet comprising (i) a nonwoven material having opposing first and second major surfaces;

(ii) a pressure sensitive adhesive, disposed on the second major surface of the nonwoven material; and (iii) a scrim material in contact with at least a portion of the pressure sensitive adhesive; and (b) adhering the at least one protection sheet to a substrate to be protected.

While suitable for use in many applications, the protection sheets described herein are well suited for protecting the inner surfaces of a paint booth to protect those surfaces from paint overspray. The protection sheets described herein are configured to capture paint overspray and prevent defects in painted surfaces.

As used herein, the term "nonwoven" means a textile structure produced by bonding or interlocking of fibers, or both, accomplished by mechanical, chemical, thermal, or solvent means and combinations in accordance with ASTM D123-03.

As used herein, "woven" means a structure produced when at least two sets of strands are interlaced, usually at right angles to each other, according to a predetermined pattern of interlacing, and such that at least one set is parallel to the axis along the lengthwise direction of the fabric, in accordance with ASTM D123-03. For the purposes of this invention the term "woven" is used interchangeably with the terms "scrim" or "netting."

BRIEF DESCRIPTION OF THE DRAWINGS

The present invention will be further described with reference to the accompanying drawings wherein like reference numerals refer to like parts in the several views, and wherein.

DETAILED DESCRIPTION

To promote an understanding of the principles of the present invention, descriptions of specific embodiments of the invention follow and specific language is used to describe the specific embodiments. It will nevertheless be understood that no limitation of the scope of the present disclosure is intended by the use of specific language. Alterations, further modifications, and such further applications of the principles of the present disclosure discussed are contemplated, as would normally occur to one ordinarily skilled in the art to which the disclosure pertains.

Where numerical ranges are used herein, the recitation of numerical ranges by endpoints includes all numbers subsumed within the range (e.g. 1 to 5 includes 1, 1.5, 2, 2.75, 3, 3.80, 4, and 5).

The present disclosure is directed to methods and articles of masking or protecting a substrate. The substrates to be protected may be a vertical surface such as a wall, or a horizontal surface, such as a floor, ceiling or bench top. More specifically, the methods and articles described herein are particularly suited for use in automotive paint booths.

In its most basic form, this disclosure relates to a method of protecting a substrate using a nonwoven protection sheet which is attached to the surface of the substrate. Certain embodiments of the articles described herein are easily positionable upon first application and easily removable after repeated bake cycles. Certain embodiments of the articles described herein also function to immobilize dried paint dust, dirt and other contaminants, while providing a white covering for the paint booth that is durable and removable.

Figure 1:
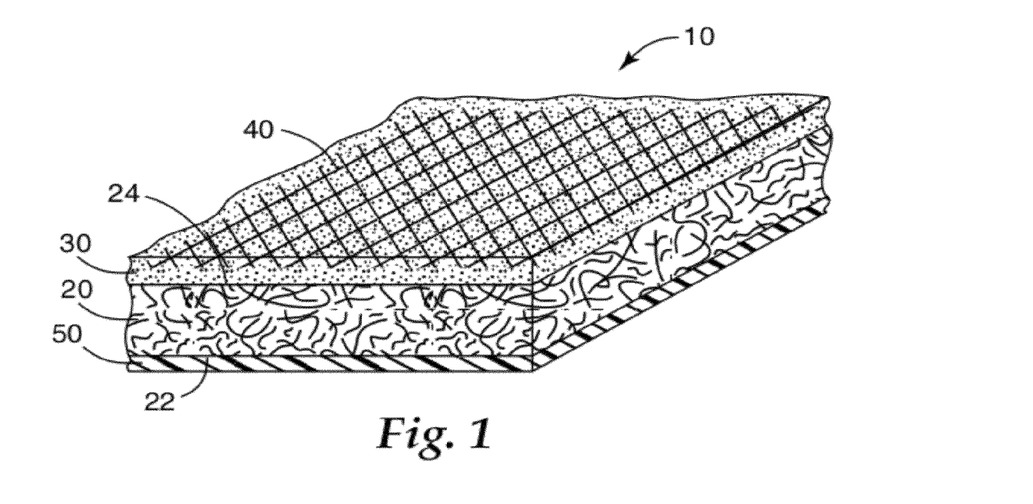
FIG. 1 is a perspective view of a protection sheet in one embodiment of the present disclosure.

Referring to FIG. 1, an exemplary protection sheet article according to one embodiment of the present disclosure is illustrated. In this embodiment, the protection sheet 10 is constructed of a nonwoven material 20 which has a first major surface 22 and a second major surface 24 opposite the first major surface 22. A layer of low adhesion backsize 50 may optionally be disposed on the first major surface 22 of the nonwoven material 20. A layer of pressure sensitive adhesive 30 is disposed on the second major surface 24 of the nonwoven material 20. A layer of scrim material 40 is disposed so that it is in partial contact with the pressure sensitive adhesive 30. The scrim material 40 may be disposed anywhere on the second major surface 24 of the protection sheet 10 relative to the layer of pressure sensitive adhesive 30. For example, the scrim material 40 may be disposed directly on the second major surface 24 of the protection sheet, with the layer of pressure sensitive adhesive placed on top of the scrim material 40. In a further example, the scrim material 40 may be fully embedded within the layer of pressure sensitive adhesive 30, such that none of the scrim material 40 is exposed. In an embodiment, the scrim material 40 is partially embedded in the layer of pressure sensitive adhesive 30. In a further embodiment, the scrim material 40 may sit on top of the layer of pressure sensitive adhesive 30 such that one side of the scrim 40 is left substantially exposed.

As shown in the embodiment in FIG. 1, the scrim layer 40 is only partially disposed in the pressure sensitive adhesive 30, thus providing at least a portion of scrim material which extends above the pressure sensitive adhesive 30 layer and which is substantially free from adhesive.

In an alternative embodiment of the present disclosure, a second scrim layer is disposed in the protection sheet embodiment shown in FIG. 1 to provide additional strength (not shown). This additional scrim layer may be placed anywhere in the structure of the protection sheet 10.

In further embodiments, the first scrim layer 40 or additional scrim layers may be disposed in the nonwoven material 20 or on the first major surface 22 or second major surface 24 of the nonwoven material 20. In some embodiments where a scrim layer 40 is desired for reinforcement, the scrim material may be laminated between the adhesive layer 30 and the nonwoven material 20. As one of ordinary skill in the art will appreciate, positioning of the scrim layer 40 can be chosen to optimize reinforcement, repositionability and removability of the protection sheet 10.

It has been surprisingly found that certain combinations of scrim layer 40 disposed within or between the pressure sensitive layer 30 and nonwoven material mechanically reinforces the pressure sensitive adhesive layer 30 in such a way as to reduce creep or flow of the pressure sensitive adhesive. Without wishing to be bound by theory, this serves to both reduce the tendency for adhesive transfer upon removal, and to reduce or eliminate the need for incorporating a low adhesion backsize material to facilitate unwinding the protection sheet material when wound in a roll (see FIG. 3). Such a finding is advantageous in simplifying the manufacturing process by eliminating the step of coating and drying a low adhesion backsize material to the first major surface 22 of the protection sheet 10. As a further advantage, since the low adhesion backsize materials are often solvent based, elimination of the low adhesion backsize material has the further advantage of eliminating undesirable solvent emissions.

It has been found that placing the scrim layer 40 on top of the pressure sensitive adhesive such that at least a portion of the scrim layer 40 is substantially free from adhesive provides an advantageous detackifying effect that can facilitate easy repositionability of the protection sheet 10 during initial placement as well as easy removability of the protection sheet 10 after repeated bake cycles.

Figure 2:
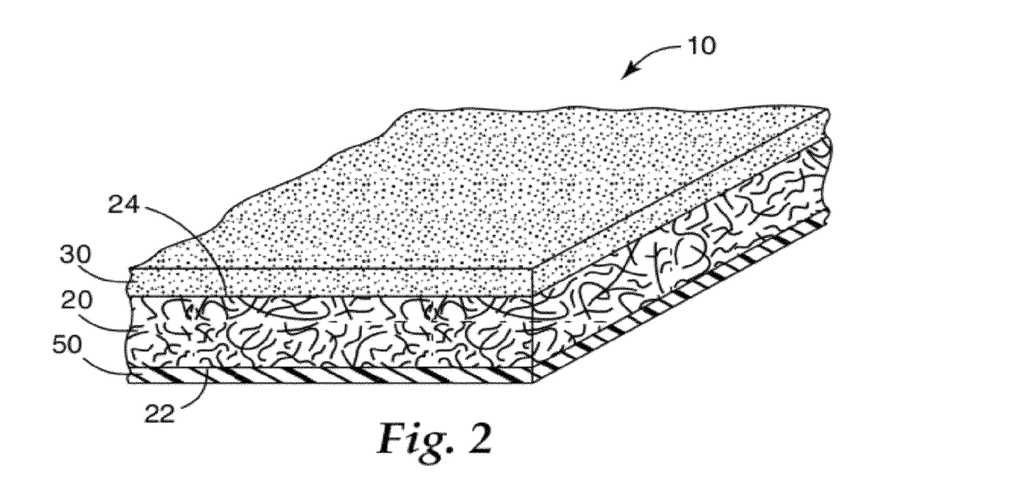
FIG. 2 is a perspective view of a protection sheet in a further embodiment of the present disclosure.

FIG. 2 illustrates another exemplary embodiment of the present disclosure. The elements and features in FIG. 2 corresponding to the elements and features illustrated in FIG. 1 are given like reference numerals. The embodiment illustrated in FIG. 2 contains the features of the embodiment illustrated in FIG. 1, except no scrim layer 40 is utilized.

Further non-illustrated embodiments of the present disclosure employ the features and elements shown in FIGS. 1 and 2 but without the layer of the pressure sensitive adhesive layer 30. In these embodiments, alternative means of releasably attaching the protection sheet 10 to a substrate are employed.

Figure 3:
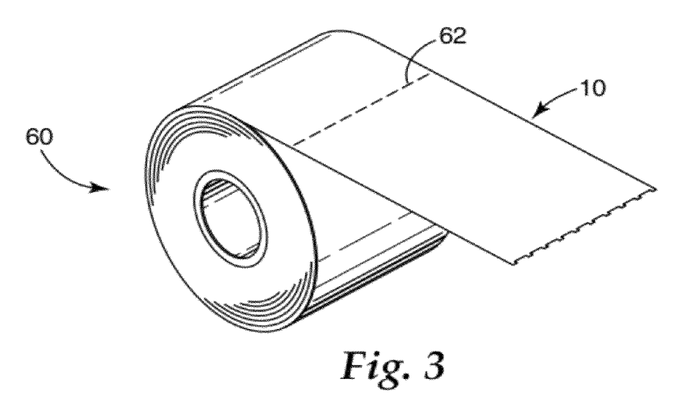
FIG. 3 is a perspective view of a roll of the protection sheet material shown in FIG. 1.

Referring now to FIG. 3, the protection sheet 10 may be supplied in the form of a roll 60 from which the required amount of material may be cut for use. Alternatively, the roll 60 of protection sheet material may contain detachment points 62 (e.g. perforations, folds, weakened spots, etc.) which allow for easy separation of sections of protection sheet material. In one exemplary embodiment, a roll that is about 1.2 meters wide and about 45 meters long is provided. In alternative embodiments, the protection sheet material 10 is supplied as individual sheets or stacks of sheets.

Figure 4:
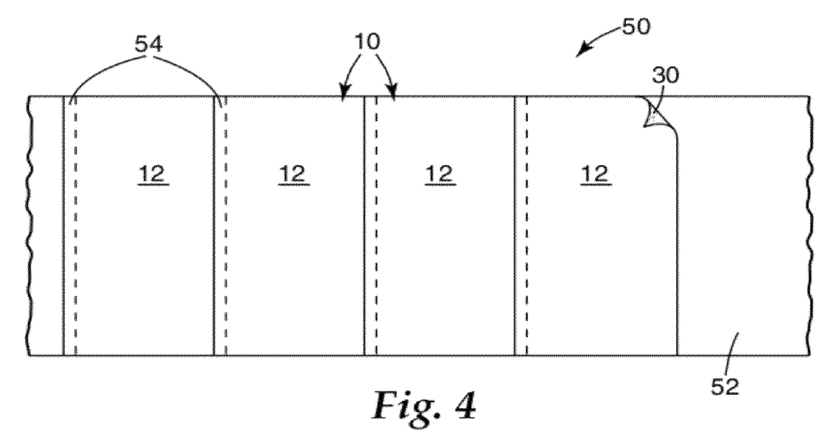
FIG. 4 illustrates a method of protecting a vertical substrate in an embodiment of the present disclosure.

FIG. 4 shows several pieces of the protection sheet 10 attached to a vertical substrate 52, such as the wall of a paint booth, wherein the protection sheet 10 is removably attached to the wall of the paint booth by a layer of adhesive 30. In a further aspect of this embodiment, the protection sheet 10 is installed onto the substrate 52 with overlapping sections 54 which ensure protection of the substrate near adjacent portions of the protection sheets. In an embodiment, the overlapping sections 54 are about one inch (2.54 cm) wide.

While the adhesive 30 shown in FIG. 4 appears only on the top portion of the protection sheet, it should be appreciated that adhesive 30 or other attachment means may be applied to any portion of the surface of the protection sheet 10. In the embodiment shown in FIG. 1, the adhesive layer 30 is applied in a continuous layer over the entire surface of the second major surface 24 of the protection sheet.

In an embodiment, the adhesive is disposed at least partially onto the top portion of the second major surface 24 of the protection sheet 10 and at least partially encapsulates fibers comprising the top portion of the second major surface 24 of the protection sheet.

In an embodiment, the adhesive is disposed so as to encapsulate both an intervening layer of scrim material and fibers comprising the top portion of the second major surface 24 of the protection sheet, causing the scrim and underlying protection sheet fibers to become at least partially bonded.

Figure 5:
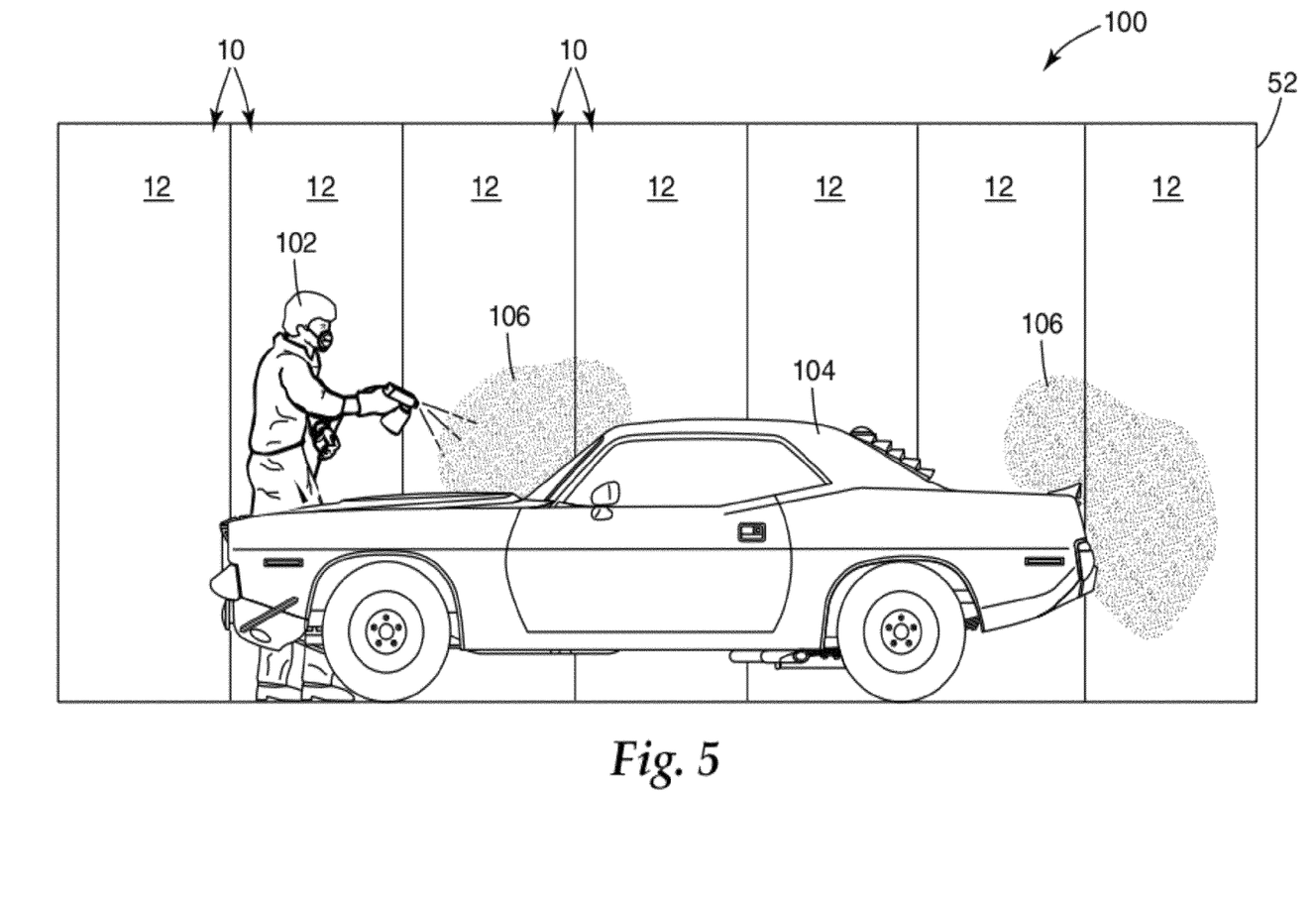
FIG. 5 illustrates a paint booth having walls covered with the protection sheet material in an embodiment of the present disclosure.

FIG. 5 shows a paint booth 100 with segments of the protection sheet 10 covering the walls 52 of the paint booth. An operator 102 is shown painting a car 104 inside the booth 100, wherein the paint overspray 106 is captured within the first major surface 12 of the protection sheet 10. Once the painting operation is complete, the protection sheet 10 may stay in place during bake cycles, as the protection sheet is resistant to thermal shrinkage up to temperatures in excess of 60° C. (180 F). The protection sheet continues to function until saturated with paint and/or particulates, dust and debris, at which point it may be peeled off and replaced.

In addition to providing protection to vertical surfaces such as the walls of a paint booth, the protection sheets 10 described herein may be used as a cover for a horizontal substrate, such as the floor of a paint booth.

Non-Woven Material

Any number of materials which are generally known in the art are suitable for making the nonwoven portion of the protection sheet described herein. As one of ordinary skill in the art will appreciate, the nonwoven material can be chosen to optimize: fiber surface area, inter-fiber bonding to prevent 'linting' or release of fibers which could also cause defects, fiber chemical composition, color, denier, or fiber basis weight.

By way of background, a nonwoven sheet derives its strength from chemical bonding or physical bonding (e.g. mechanical bonding) of its composite fibers. In the former process, the fibers may be coated with an adhesive resin which is cured or solidified to "resin-bond" the web. In the latter process, the fibers may be melt blown together in which blown fibers may bond together by mutual melting at a sufficient temperature.

Mechanical bonding entangles fibers to confer strength to the web, commonly by needle punching or spun lacing. In the latter method, jets of high-pressure water are directed at an incoming dry-laid web of non-bonded fibers. The jet action serves to highly entangle the web's fibers and yields a nonwoven of high strength. This process is described in U.S. Pat. No. 3,403,862 and U.S. Pat. No. 3,485,706. Spun laced fibers have the advantage of soft handle and conformability, sometimes referred to as drapability.

In one embodiment of the present disclosure, the nonwoven material comprises spun laced fibers selected from the group comprising polyester fibers, rayon fibers, polyolefin fibers (e.g. polypropylene and blend fibers), cotton fibers, and equivalents and blends thereof. In one more specific embodiment of the present disclosure, the nonwoven material comprises spun laced polyester fibers.

Nonwoven materials are typically described in terms of material basis weight, that is, the weight of a defined unit area of material. Some embodiments of the present disclosure comprise nonwoven materials with material basis weights ranging from about ten grams/meter$^2$ to about eighty grams/meter$^2$, other embodiments from about twenty grams/meter$^2$ to about sixty-five grams/meter$^2$, and in yet further embodiments from about twenty-five grams/meter$^2$ to about forty-five grams/meter$^2$. As one of ordinary skill in the art will appreciate, the protection sheet should be constructed with materials providing strength such that the protection sheet can withstand removal forces across a large peel front (e.g., 1.2 meters or greater) after repeated bake cycles and vehicle or foot traffic. In addition one of ordinary skill in the art will appreciate that the protection sheet may be constructed of any material, such as woven or nonwoven fibers or fabrics, alone or in combination, so long as the minimal mechanical and application properties are met.

While not wishing to be bound by theory, it is thought that protection sheets constructed from nonwoven materials act much like a static filter, taking advantage of the predominant airflow supply direction in the typical paint booth. The predominant airflow in such a booth is from ceiling to floor, and hence mainly parallel to the surface of the nonwoven protection sheet rather than perpendicular to the surface as for typical filtration geometries. It has surprisingly been found that even in the parallel flow situation, substantial particulate debris is captured within the fibrous surface.

Attachment Materials

Adhesive Materials

One embodiment of the present disclosure employs a continuous layer of pressure sensitive adhesive which is substantially impermeable to gas and liquid transport. As used herein, the term pressure sensitive adhesive means an adhesive that is normally tacky and will adhere to a substrate upon the application of moderate pressure, e.g. hand pressure, or the application of light force. The term substantially impermeable, as used herein, refers to the functionality of the adhesive at blocking paint overspray, thinners, and other solvent materials from transporting through and contaminating the walls of the paint booth.

In another embodiment of the present disclosure, the adhesive employed is capable of withstanding at least about 96 bake cycles at a temperature of about 60-80° C., yet is able to be removed cleanly without a high level of adhesive removal force or adhesive transfer. A typical body shop may paint cars at rate of eight per week in a single paint booth, and it is desirable that the method of the present disclosure be useful for up to twelve weeks. Therefore it is desirable that the protection sheet be removable without leaving adhesive residue after about 96 cycles of painting and baking.

Exemplary adhesives include normally tacky and pressure sensitive adhesive systems, such as adhesives having thermal stability up to the use temperatures typically encountered in spray paint booths, yet are removable after such temperature exposure. Exemplary adhesives system can be taken from the group comprising acrylate polymers, natural and synthetic rubbers, silicone polymers, polyurethanes, polyolefins, polyvinyl ethers and styrene block copolymers.

In one embodiment of the present disclosure, the following adhesive is utilized: a PSA made using the process described in U.S. Pat. Nos. 6,294,249 and 5,804,610 (incorporated by reference herein) comprising an acrylate adhesive having a monomer blend range from about 100/0% to about 95/5% iso-octyl acrylate (IOA)/acrylic acid (AA), from about 0.07 to about 0.30% 2,2-dimethoxy-1,2-diphenylethan-1-one, commonly known as Irgacure 651 from Ciba Specialty Chemicals Corporation, from about 0 to about 0.05% Iso-octyl thioglycolate (IOTG) from Evans Chemetics, LP, from about 0.10 to about 0.25% alpha-benzophenone (ABP), from about 0 to about 0.6% octadecyl 3-(4-hydroxy-3,5-ditertbutyl-phenyl) propanoate commonly known as Irgacure 1076 FD from Ciba Specialty Chemicals Corporation, and from about 0 to about 0.02% 1,6-Hexane Diol diacrylate (HDDA). The resulting adhesive can be coated or laminated on the nonwoven substrate by methods known in the art, thus forming the resultant pressure sensitive adhesive article.

While the adhesive may be applied as a solid or continuous layer of material, in some embodiments, the adhesive may be discontinuously coated in a stripe, dot or other pattern to limit adhesion build, thus making the protection sheet easier to remove. The adhesive may in addition be applied with sufficient pressure to permit interpenetration of the adhesive at least partially into the top portions of the second major surface 24 of the protection sheet 10.

Additional Attachment Materials

Alternative methods of attachment of the protection sheet to the substrate may be afforded by several means, including the use of magnets, snaps, clips or mechanical fasteners. In an embodiment, a mechanical fastener comprising a strip of hook members is used. U.S. Pat. No. 5,848,375 (Miller et al.), incorporated by reference in its entirety herein, describes a mushroom-type hook strip for a mechanical fastener that is suitable for use in the methods and articles described herein.

The hook strip may contain a layer of an adhesive on its surfaces opposite the hooks with which the backing may be adhered to the substrate. As one of ordinary skill in the art will appreciate, many adhesives would be suitable for use with the strip of hook material. In one embodiment, a pressure sensitive adhesive is used.

Scrim Material

The optional woven or scrim material can be used to improve handling by reducing surface adhesive tack and provide tensile reinforcement for removal after repeated exposure to thermal bake cycles. A woven scrim or fabric is a textile constructed from interlaced threads or strips of material into an integral fabric. Alternatively, the scrim may be constructed of a net of fibers that are bonded by adhesive or via mutual melting at intersecting points.

A particular type of scrim utilized in this invention is otherwise known as a greige cloth, which is defined as a "light to medium weight, loom state, woven fabric without any additional finishing. Commonly known as gauze to print cloth to scrim . . . Greige cloth, taken directly from the loom, is not processed through any additional finishing operations." (taken from the website for American Fiber and Finishing Co., Albermarle, N.C. http://www.affinc.com/).

Typically a woven scrim is identified on the basis of thread count and fiber denier, as defined in ASTM D123-03. Thread count is usually given as number of threads in the warp or machine direction and number of threads in the fill or cross direction. Thus for example a 30/10 scrim has 30 threads in the warp direction for every 10 threads in the fill direction. Similarly, the fiber diameter, in denier, is usually given as the warp fiber denier and fill fiber denier, for example, a 70/150 scrim has warp fibers of 70 denier and fill fibers of 150 denier. For the purposes of this disclosure, the thread count is chosen such that the balance of adhesiveness and ease of handling as well as reinforcement by the scrim are optimized; too high a thread count gives too tight a mesh, hence very little adhesive contact for a scrim overlaid on top of the adhesive layer. Too low a thread count gives too open a mesh, which is difficult to handle and can be insufficient in terms of handling improvement. Similarly, too high a fiber denier is undesirable, because the composite becomes too stiff and boardy, and the fiber diameter is too large to permit a desirable level of adhesiveness to the composite. Too low a fiber denier limits the ability of the scrim to reinforce the composite. In one embodiment, a 17/6 material having a 70/150 denier is used. In a further embodiment, the material can have from 10 to 50 warp threads and from 3 to 50 fill threads per inch, and the denier can range in the warp from about 50 to about 150, and in the fill from about 50 to 250 denier.

Another type of scrim utilized is an extrusion formed plastic netting in which a net of fibers is bonded at its intersecting points via melt processing. One example is the process of extrusion and orientation to produce netting based on a variety of resins, such as polyethylene, polypropylene, ethylene vinyl acetate, and others. An example is a composite plastic netting comprising polyethylene and ethylene vinyl acetate available from Conwed Plastics, Inc., Minneapolis, Minn. Generally, any woven or nonwoven scrim known in the art can be utilized for the protection sheets of the present disclosure. An exemplary scrim material for the present disclosure is a scrim comprising woven fibers, for example, unfinished greige cloth. Alternative exemplary scrim materials comprise woven polyester or polyester blend fibers.

Alternatively, extruded plastic netting materials can be employed for the scrim. Such netting is typically produced by extrusion of individual plastic strands into an interconnecting network to provide net-like structures by using either a rotary or reciprocating extrusion process. Methods describing processes to produce plastic netting are given in U.S. Pat. No. 3,700,521; U.S. Pat. No. 3,767,353; U.S. Pat. No. 3,723,218; and U.S. Pat. No. 4,123,491. These disclosures are incorporated by reference into the present application in their entirety.

Some embodiments of the present disclosure comprise a scrim material having a thread count with less than about one hundred threads in the warp or machine direction for every thirty threads in the fill or cross direction, in some other embodiments less than about fifty threads in the warp direction for every thirty threads in the fill direction, and in yet further embodiments less than about thirty threads in the warp direction for every fifteen threads in the fill direction.

As one of ordinary skill in the art will appreciate, the thread count and fiber denier can be selected such that a proper balance between material reinforcement, tackiness and adhesiveness is met. In embodiments of the present disclosure where the scrim is at least partially free from adhesive, if the scrim material has too high a thread count and/or too high fiber denier, then too much of the underlying pressure sensi tive adhesive layer is covered and the protection sheet is not tacky or adhesive enough to stay in place where desired. Conversely, if the scrim material has too low a thread count and/or too low fiber denier, then lamination to the adhesive surface becomes difficult, the material is not reinforced properly, and the surface can become too tacky and adhesive for easy positioning.

Low Adhesion Backsize Material

Application of the low adhesion backsize provides a surface with a reduced adhesive affinity for the pressure sensitive adhesive. Such reduced adhesion facilitates the separation of stacked sheets of protective sheet material. Reduced adhesion also facilitates the unwinding of the protection sheet material when it is provided on a roll. A low adhesion backsize may be omitted where the releasable attachment means is something other than adhesive.

Materials suitable for use as a low adhesion backsize in this disclosure include acrylates, fluorochemicals, polyethylenes, silicones, vinyl copolymers and combinations of these compounds. Compounds suitable as a low adhesion backsize are disclosed in U.S. Pat. No. 4,728,571 issued to Clemens et al. A specific example of a suitable low adhesion backsize is SYL-OFF™, a silicone compound available from Dow Corning Corp. Exemplary low adhesion backsize compositions are the siloxane and acrylate based compounds disclosed in U.S. Pat. No. 4,973,513 issued to Riedel, and the water-insoluble hydrophobic urethane (carbamate) copolymer of polyvinyl alcohol and octadecyl isocyanate disclosed in U.S. Pat. No. 2,532,011 issued to Dahlquist et al.

Brightener Additives

In some embodiments of the present disclosure, optical brighteners are added to the protection sheet nonwoven material to make the protective sheet appear whiter and brighter. Brighter protection sheets in the paint booth aids the worker in visualization and precise color matching.

Color additives such as titanium dioxide, calcium carbonate, mica, clay, aluminum trihydrate, and zinc oxide can be used to impart neutral coloring to the protection sheet. Other fillers, color additives and pigments known in the art may be used. For example, color additives that impart a bright white or dull gray finish may be used.

One exemplary class of brightener chemicals are stilbenes. The molecules that make up these additives are fluorescent dyes such as umbelliferone, which absorb energy in the UV portion of the spectrum. This energy is then re-emitted in the blue portion of the visible spectrum. Thus, a white surface treated with an optical brightener emits more visible light than shines on it, making it appear brighter. The blue light emitted hides yellow and brown tones, making treated materials appear whiter.

Additional Characteristics

In one embodiment, the nonwoven sheet has a tensile break strength in the machine direction of at least about 45 N/25 mm, or at least about 65 N/25 mm, or at least about 90 N/25 mm; an elongation to break in the machine direction of less than about 100%, or less than about 70%; and a tensile modulus in the machine direction of less than about 50 MPa, or less than about 40 MPa as measured by ASTM D885-02 (Tensile Properties of Thin Plastic Sheeting).

In another embodiment, the nonwoven sheet has a trouser tear strength in both the machine and cross or transverse directions of greater than about 330 N, or greater than about 445 N, or greater than about 650 N as measured by ASTM D1938-06 (Trouser Tear of Plastic Film).

In a further embodiment, the nonwoven sheet exhibits a transmitted light intensity of less than about 75% as measured using ASTM D1003-00 (Haze and Luminous Transmittance of Transparent Plastics).

In an embodiment, the adhesive coated protective article disclosed herein has an initial peel force of at least 5 kg/m, preferably at least about 10 kg/m, and more preferably between about 15 and 25 kg/m at room temperature as measured using ASTM D3330/D3330M—04 Standard Test Method for Peel Adhesion of Pressure-Sensitive Tape.

In an embodiment, the adhesive coated protective article has a peel force after 96 bake cycles of less than about 80 kg/m, or less than about 55 kg/m, or less than about 35 kg/m as measured using ASTM D3330/D3330M—04 Standard Test Method for Peel Adhesion of Pressure-Sensitive Tape.

In an embodiment, the adhesive coated protective article of this disclosure has a resistance to adhesive delamination from the backing as measured according to ASTM D3330/D3330M—04 Method B of greater than about 35 kg/m, preferably greater than about 45 kg/m, and more preferably greater than about 55 kg/m.

It is preferred that the adhesive coated protective article exhibit, when peeled from stainless steel after 96 bake cycles, little or no tendency to transfer adhesive to the stainless steel substrate, as estimated after peeling according to observed adhesive residue on the surface.

In an embodiment, the adhesive coated nonwoven sheet exhibits a retained particulate value of at least about 10%, or greater than 15%, or greater than about 20% by weight of standardized cornstarch particulate after air pressure removal.

In an embodiment, the adhesive coated nonwoven article upon installation improves the ambient light intensity by at least 30%, or at least by 50% as measured at a fixed height of 32" from the paint booth floor using a Radiometer/Photometer, Model SPL 024Y (Coherent Inc., Santa Clara Calif.).

In an embodiment, a nonwoven or woven scrim material is disposed on the adhesive coated surface of the adhesive coated nonwoven article such that the nonwoven or woven scrim material resides at least partially on top of the adhesive surface of the adhesive coated nonwoven article, wherein the scrim has a basis weight and/or warp and fill characteristic such that the adhesive coated surface beneath can contact, under pressure, a substrate to which the composite structure is applied, that is, the fiber diameter or denier, density and arrangement allows at least partial adhesion of the adhesive and a substrate to which it is attached. In practical use, this means the protection sheet construction can be mounted vertically without falling down from the walls of a paint booth, or can be mounted securely to the floor of a paint booth to allow normal operations therein. In the latter case, the level of adhesion should be sufficient to withstand the compression, shear and torque imposed by rolling or turning vehicle tires atop the material construction as installed.

In another embodiment, a second nonwoven or woven scrim material is disposed in the adhesive coated surface of the adhesive coated nonwoven article such that the second nonwoven or woven scrim material is mostly or fully contained within the adhesive coating thickness.

EXAMPLES

1. Example Constructions

A. Nonwoven & Comparative Materials

Nonwoven and comparative materials used in experiments are given in Table 1:

TABLE 1

SAMPLE DESIGNATIONS

| Sample | Designation | Thickness* | Composition | Source |
|---|---|---|---|---|
| Example 1 | SX567 | 40 gsm | 100% polyester spunlace | Ahlstrom Corp., Green Bay, WI |
| Example 2 | Grade 200 | 55 gsm | 50/50 rayon/polyester spunlace | Ahlstrom Corp., Green Bay, WI |
| Example 3 | SX362 | 40 gsm | 60/40 Tencel ©/polyester spunlace | Ahlstrom Corp., Green Bay, WI |
| Example 4 | Sontara ™ 8010 | 44 gsm | 100% polyester spunlace | DuPont Nonwovens Inc., Old Hickory, TN. |
| Example 5 | Securon SMS | 60 gsm | PP Spunbond/meltblown/spunbond | Fiberweb Inc., Green Bay, WI. |
| Example 6 | SX145 | 45 gsm | 100% polyester spunlace | Ahlstrom Corp., Green Bay, WI |
| Comparison 1 | 85/15 PP/PE BMF | 25 gsm | Blown microfiber nonwoven | 3M Co., St. Paul, MN. |
| Comparison 2 | Booth Flooring, Part No. 442 | 3 mil | Adhesive coated cast polyethylene | RBL Products Inc., Detroit, MI. |
| Comparison 3 | High Strength Floor Grade | 5 mil | Extrusion coated polypropylene nonwoven | Chemco Mfg. Co., Chicago, Il. |

B. Scrim Materials

1. Overspray Pickup

A test was developed to emulate a working paint booth, which becomes contaminated with paint overspray and may be subsequently subjected to accidental air discharge of about 20-60 psig from the paint spray guns used. The test measures the weight percentage of particulate contaminant that is trapped and retained after exposure to a high pressure air blast for examples of the current invention.

A test chamber was fabricated comprising a section of rigid PVC pipe 18" (45.7 cm) in length having a diameter of 3" (7.6 cm) and walls 0.25" (0.64 cm) thick. The pipe was clamped in the horizontal position at its midpoint to a ringstand. The exit or rear of the pipe was fitted to a ring clamp that allowed mounting of a plastic overflow bag to the exit to trap and contain the particulate matter generated in the test. A nonwoven sample of 6"×9" (15.2 cm×22.9 cm) was laminated to a 2 mil sheet of oriented polypropylene film using 3M Cat. No. 467 laminating adhesive (3M Company, St. Paul, Minn.). The sample assembly was weighed and inserted, nonwoven side facing inward, into the pipe and retainer chamber radially in its shorter dimension (6", 15.2 cm) so as to completely encircle the internal portion of the pipe and fitted against a sample stop at a distance of 11" (27.9 cm) into the pipe.

A 2 gm. measure of cornstarch powder (5-510 73046 Laboratory Grade, Fisher Scientific Co., Fair Lawn N.J.) was used as the particulate contaminant agent for this test.

Cornstarch was chosen because the mean or average particle diameter of about 8 µm (O. A. Gutierrez et al., Crop Science, 42, 355-359 (2002)) is very similar to that found in automotive paint spraying operations (T. L. Chan et al., Am. Ind. Hyg. Assoc. J., 47(7), 411-417 (1986)). For both types of particulates the actual size ranges from much smaller to much greater mean particulate diameters.

The cornstarch powder was fed from a sample cup and introduced into the test chamber using a 3M Body Schutz Applicator Gun, Cat. No. 08997, St. Paul, Minn., with a siphon air pressure of 20 psi. The sample assembly was then removed from the test chamber, and reweighed to determine the weight percentage of particulate pickup based on the initial 2 gm measure. Finally, the sample assembly was clamped to an 18 gauge sheet metal backstop mounted at an angle of 45°, and exposed to a 10 second blast with compressed air at 20 psi using a clean gun. The assembly was reweighed to determine the percentage amount of particulate retained after blowing with air. The results are given in Table 2:

TABLE 2

PARTICULATE PICKUP/RETENTION

| Sample | Mass gain (gm) | Weight % Pickup | Mass retain (gm) | Weight % Retain |
|---|---|---|---|---|
| Example 1 | 0.69 | 34.5 | 0.46 | 23.2 |
| Comparison 2 | 0.30 | 14.9 | 0.04 | 1.8 |
| Example 5 | 0.46 | 23.2 | 0.23 | 11.5 |
| Example 4 | 0.72 | 36.2 | 0.48 | 23.9 |
| Example 2 | 0.59 | 29.3 | 0.38 | 19.0 |
| Comparison 3 | 0.31 | 15.7 | 0.15 | 7.4 |
| Comparison 1 | 0.44 | 22.0 | 0.31 | 15.7 |

In practice, it is required that the protection sheet capture or pickup and retain as much particulate matter as possible, whether the source of the contamination is overspray, dirt, dust, etc. Comparative examples 1 and 2 capture about half of the particulate agent in this test compared to the inventive examples, and retain less than 10% by weight of the particulate agent. Conversely, the inventive examples capture a significantly greater mass of particulate agent, and retain a greater mass as well. Retention after an air blast indicates the material is able resist releasing the contaminants, for example, during use or upon removal, so as to minimize the amount of particulate matter in the work environment.

2. Mechanical Properties of Nonwovens

The tensile strength and elongation and the tear strength measurements of example nonwoven materials are give in Table 3. Tensile strength, in N to break per 1" width and 20 elongation were evaluated using ASTM D882-02. Trouser tear strength was evaluated using ASTM D1938-06.

TABLE 3

TENSILE & TEAR STRENGTH OF EXAMPLE NONWOVENS

| Sample | Test Direction | Tensile Peak Load (N) | Tensile Strain @ Break (%) | Tensile Modulus (MPa) | Tear Strength (N) | Transmission (%) |
|---|---|---|---|---|---|---|
| Example 1 | MD | 90 | 78 | 33.4 | 712 | 73.8 |
|  | CD | 19 | 189 | 2.3 | 748 |  |
| Example 2 | MD | 67 | 56 | 38.2 | 406 | 65.6 |
|  | CD | 13 | 205 | 1.1 | 429 |  |
| Example 3 | MD | 67 | 56 | 38.2 | 406 | 65.6 |
|  | CD | 13 | 205 | 1.1 | 429 |  |
| Example 4 | MD | 53 | 84 | 16.5 | 932 | 72.1 |
|  | CD | 16 | 96 | 2.7 | 696 |  |
| Example 5 | MD | 77 | 116 | 57.5 | 1069 | 33.0 |
|  | CD | 26 | 237 | 13.4 | 779 |  |
| Example 6 | MD | 105 | 90 | 13.0 | 741 | 64.9 |
|  | CD | 37 | 168 | 2.5 | 553 |  |

In one embodiment, the nonwoven sheet has a tensile break strength in the machine direction of at least about 45 N/25 mm, or at least about 65 N/25 mm, more or at least about 90 N/25 mm; an elongation to break in the machine direction of less than about 100%, or less than about 70%; and a tensile modulus in the machine direction of less than about 50 MPa, or less than about 40 MPa. If the tensile strength is less than the indicated limits, then the material may not be strong enough to withstand the force required to remove after repeated bake cycles and vehicle traffic. Similarly, if the elongation to break of the material is much greater than the indicated limits, then the material may be too stretchy to remove easily and quickly. If the tensile modulus is much greater than the indicated limits, then the material may be too stiff to handle well and conform around irregularities in the paint booth structure.

In an embodiment, the nonwoven sheet has trouser tear strength in both the machine and cross or transverse directions of greater than about 330 N, preferably greater than about 445 N, and more preferably greater than about 650 N. If the tear strength of the material is much less than the indicated limits, then the material may tear or shred when being removed after repeated bake cycles and vehicle traffic.

In another embodiment, the nonwoven sheet exhibits a light transmission as measured using a BYK-Gardner Haze-Gard Plus (cat. No. 4725) light meter of less than about 75%. Transmitted light intensity is a measure of a material's opacity or hiding power, with lower hiding power being generally preferred. If the transmitted light intensity is much greater than about 75%, then the protective sheet allows the appearance of the paint booth substrate to show, which can result in a reduction of ambient light and may be unsightly.

3. Light Measurements

The protective sheet was installed onto the interior surfaces of two commercial paint booths, fitted with standard industrial fluorescent lighting, to determine the effect of the protective sheet on ambient lighting, which was measured using the light intensity meter described earlier. In this measurement the light meter was fixed at a height of about 0.8 meters above floor level with the sensor oriented vertically. The ambient light intensity is measured at four locations, that is, the midpoint of the four walls of a paint booth. The light intensity was measured initially, that is, prior to installation of the inventive concept, and then after installation. After 45 days of operation under normal working conditions the light intensity was re-measured. The data is assembled in Table 4, wherein ambient lighting is measured in foot candles, also known as lumens per square foot (the SI measure is LUX, where 1 foot candle=10.764 LUX):

TABLE 4

AMBIENT LIGHTING MEASUREMENT

| Surface | Initial | Installed | Remove (+45 days) | % Change @ install | % Change (+45 days) |
|---|---|---|---|---|---|
| Front | 3.8 | 6.2 | 3.6 | 63.2 | -3.2 |
| Side | 5.6 | 7.5 | 3.8 | 33.9 | -24.0 |
| Rear | 4.3 | 7 |  | 62.8 |  |
| Side | 4.3 | 7.5 | 4.9 | 74.4 | 8.0 |
| Front | 10.1 | 15.8 | 9.5 | 56.4 | -3.8 |
| Side | 7.6 | 13.4 | 12.6 | 76.3 | 37.3 |
| Rear | 6.7 | 11.5 |  | 71.6 |  |
| Side | 8.4 | 14.3 | 11 | 70.2 | 18.2 |

From the Table there is a significant improvement in ambient lighting upon installation of the product. After 45 days of operation the protective sheet can still provide some improvements, however, the protective sheet has typically become saturated with paint overspray, dust, dirt, and other contaminants such that the ambient lighting becomes less than at the installation time. At this point the protective sheet is stripped off and discarded, and a fresh sheet is installed to renew the improved lighting.

5. Adhesive Examples

Preparation of Coated Samples

Test samples were prepared by adhesive coating the backing material comprising a desired nonwoven sheet, or combination of nonwoven sheet and scrim material. In an embodiment, the test adhesives are metered onto the backing material by a hot melt coating process. The adhesive is melted and metered using a twin screw extruder fitted with a 15 cm width slot die. In the practice of this invention, any combination of unwind, laminating, coating, chilling and curing stations may be suitably employed. In an embodiment the nonwoven backing material is first laminated to the scrim material before entering the coating station, then coating directly onto and through the scrim material so that the molten adhesive contacts and penetrates into the top portion of the nonwoven material. In another embodiment, the nonwoven backing material may first be coated with the adhesive, then laminated to the scrim material. The adhesive may be subjected to crosslinking before or after lamination with the scrim. The coated adhesive solidifies rapidly, and is cured by exposure to UV irradiation at suitable intensity and wavelength. Coating weight, adhesive melt temperature, depth of die penetration into the backing composite, line speed and curing conditions are all adjustable to provide an optimal product.

Coated Examples

Experimental adhesives were produced with the compositions as detailed in Table 5. The process utilized to produce these adhesives is described in U.S. Pat. No. 5,902,654, U.S. Pat. No. 6,294,249 and U.S. Pat. No. 6,928,794, incorporated herein by reference.

Inventive adhesive examples were chosen to maximize penetration of the adhesive during processing within the nonwoven material to allow for optimizing anchorage of the adhesive to the woven scrim and/or nonwoven. In turn this results in reduced tendency of the adhesive layer to delaminate or transfer to the substrate to which it is attached during removal after baking and use. It is desirable that the adhesive withstand repeated paint booth bake cycles without building too great a level of peel adhesion, which would result in great removal difficulty. The raw materials used to produce the inventive adhesives and adhesive recipes are given in Table 5.

The table below lists several components of the pressure sensitive adhesive in weight percent:

| | |
|---|---|
| AA | Acrylic Acid |
| HDDA | 1,6-Hexanediol diacrylate |
| IOTG | Isooctyl thioglycolate |
| Irgacure 651 | Photoinitiator (Ciba Inc., Tarrytown, NY) |
| ABP | 4-acryloxybenzophenone |
| UVA, UVC | Wavelength of UV radiation |
| | UVA 400 nm-320 nm |
| | UVB 320 nm-290 nm |
| | UVC 290 nm-100 nm |

C. Adhesive Residue After Peeling

The amount of adhesive which transfers to the stainless steel test substrate upon removal of test samples was estimated and ranked according to the approximate levels given here:

| | |
|---|---|
| + | No transfer to about 15% of test panel coverage with light adhesive residue |
| o | 15% to 25% of test panel coverage with light adhesive residue |
| − | Greater than 25% test panel coverage with light to heavy adhesive residue |

TABLE 5

| Example | PSA-1 | PSA-2 | PSA-3 | PSA-4 | PSA-5 | PSA-6 | PSA-7 | PSA-8 | PSA-9 |
|---|---|---|---|---|---|---|---|---|---|
| AA | 1.75 | 1.75 | 1.75 | 1.75 | 1.75 | 1.75 | 1.75 | 1.75 | 1.75 |
| Irgacure 651 | 0.25 | 0.25 | 0.25 | 0.25 | 0.25 | 0.25 | 0.25 | 0.25 | 0.25 |
| IOTG | 0.015 | 0.021 | 0.015 | 0.021 | 0.015 | 0.021 | 0.015 | 0.021 | 0.018 |
| ABP | 0.14 | 0.14 | 0.14 | 0.14 | 0.16 | 0.16 | 0.16 | 0.16 | 0.15 |
| HDDA | 0 | 0 | 0.002 | 0.002 | 0 | 0 | 0.002 | 0.002 | 0.001 |
| mJ UVA | 150 | 150 | 150 | 150 | 150 | 150 | 150 | 150 | 150 |
| Coat Wt (grams/meter$^2$) | 30 | 30 | 30 | 30 | 30 | 30 | 30 | 30 | 30 |

For comparative purposes a commercially available adhesive coated nonwoven tape sold as a medical dressing having similar nonwoven properties was utilized (3M™ Medipore™ surgical tape, Cat. No. 2962, 3M Company, St. Paul, Minn.).

6. Test Methods

A. Heat Cycling

Sample strips 2.5 cm×15 cm were laminated to clean stainless steel test substrates using a 4.5 kg steel roller to ensure wetting of the adhesive, and the assembly placed in a sample holder in a temperature cycling oven (Despatch Industries, Minneapolis, Minn.) equipped with Protocol Plus™ temperature control software. A single heat cycle is defined as a temperature ramp at approximately 1°/min from 25° C. to a temperature 60° C., at which temperature the sample panel is held for 30 minutes. The temperature is then reduced at a rate of 1°/min to 25° C. and held for 30 minutes.

Samples were subjected to thermal cycling 96 times, and the 180° angle peel forces measured. The 180° angle peel force was measured at a test rate of 228 cm/min using an IMASS Peel Tester with automatic calculation of peel force averages taken from the midsection of the peel force vs. peel length data. After peeling, the amount of adhesive residue if any left on the stainless steel test substrate was estimated by comparison to a standard. This data is presented as "% adhesive transfer" in the Tables to follow.

B. Peel Adhesion to Steel Testing

The 180° peel angle characteristics of samples were evaluated according to ASTM D3330/D3330M—04 Standard Test Method for Peel Adhesion of Pressure-Sensitive Tape and the following procedure. Sample test strips 2.5 cm×15 cm were adhered to a clean stainless steel test substrate using a 4.5 kg steel roller to ensure wetting of the adhesive on the substrate. Samples were subjected to peel testing at a peel angle geometry of 180° using an IMASS SP-2000 Slip/Peel Tester (available from IMASS Inc., Accord, Mass.) at a peel rate of 35 cm/min with a load cell capacity of 4.5 kg.

D. Adhesive Delamination Testing

The resistance of sample materials to adhesive delamination from the backing layers was evaluated by measuring peel force at an angle of 90° of the sample from an anodized aluminum substrate according to ASTM D3330/D3330M—04 Standard Test Method for Peel Adhesion of Pressure-Sensitive Tape and the following procedure. Test strips 2.5 cm×15 cm were adhered to anodized aluminum test plates using a 4.5 kg steel roller to ensure wetting of the adhesive on the substrate. Samples were subjected to peel testing at an angle of 90° using an IMASS SP-2000 Slip/Peel Tester (available from IMASS Inc., Accord, Mass.) at a peel rate of 35 cm/min with a load cell capacity of 4.5 kg.

E. Adhesive Roll Unwind Testing

The force to unwind layers of sample in roll form was evaluated according to ASTM D3811/D3811M-96(2006) Standard Test Method for Unwind Force of Pressure-Sensitive Tapes with 5 cm width×20 m length sample rolls using an IMASS SP-2000 Slip/Peel Tester (available from IMASS Inc., Accord, Mass.) fitted with an tape unwind fixture and an unwind rate of 35 cm/min.

F. T-Peel Adhesion Testing

The force to separate layers of sample materials in a T-peel configuration was evaluated according to ASTM D1876-01 Standard Test Method for Peel Resistance of Adhesives (T-Peel Test), using an IMASS SP-2000 Slip/Peel Tester (available from IMASS Inc., Accord, Mass.) fitted with a T-Peel test fixture and using a peel rate of 228 cm/min.

7. Results

The adhesive examples from Table 6 were evaluated for 180° peel adhesion to steel and adhesive residue estimates after 96 bake cycles as described herein. The adhesion and transfer results are given in Table 6.

TABLE 6

|  | PSA-1 | PSA-2 | PSA-3 | PSA-4 | PSA-5 | PSA-6 | PSA-7 | PSA-8 | PSA-9 |
|---|---|---|---|---|---|---|---|---|---|
| Peel Adhesion (initial) (kg/m) | 14.2 | 11.2 | 14.2 | 12.6 | 12.1 | 14.0 | 13.1 | 12.2 | 13.4 |
| Peel Adhesion (96 cycles) (kg/m) | 30.1 | 31.6 | 35.3 | 22.7 | 23.9 | 24.3 | 31.1 | 20.6 | 37.9 |
| Adhesive Transfer | ○ | ○ | ○ | − | + | ○ | ○ | ○ | ○ |

With reference to Table 6, adhesive formulations PSA3 and PSA-5 were chosen for further coating studies, given the novel combination of a low level of increased peel adhesion, or adhesion build, with bake cycling and very low level of adhesive transfer. It is desirable for embodiments of this invention to exhibit low levels of adhesion build with clean removal for an easy to use product.

These adhesive formulations were applied by hot melt coating onto Example 1 nonwoven material as detailed in Table 8. In these examples, several of the nonwoven materials were gravure roll coated with a low adhesion backsize (LAB, described earlier) material prior to adhesive coating. The notation "% drive" associated with LAB coating refers to the speed of the gravure roll relative to the nonwoven material, with 100% referring to matched speeds with the nonwoven, and 150% referring to overspeeding the gravure roll so it is moving 50% faster than line speed, such that the 150% drive example experiences a heavier LAB application. The gravure roll geometry and texture may be varied to provide the desired final LAB coating weight. The notation "scrim" in Table 8 refers to the inclusion and location of a woven scrim material as described in this invention.

TABLE 7

| Example | LAB (% drive) | Scrim | Adhesive | Coat Wt (grams/meter²) | Cure (mJ UVA) |
|---|---|---|---|---|---|
| NW-1 | None | None | PSA-3 | 20 | 150 |
| NW-2 | None | None | PSA-3 | 30 | 150 |
| NW-3 | 100 | None | PSA-3 | 30 | 150 |
| NW-4 | 150 | None | PSA-3 | 30 | 150 |
| NW-5 | None | None | PSA-5 | 20 | 150 |
| NW-6 | None | None | PSA-5 | 30 | 150 |
| NW-7 | None | Internal | PSA-5 | 30 | 150 |
| NW-8 | None | Top | PSA-5 | 30 | 150 |
| NW-9 | 150 | None | PSA-5 | 30 | 150 |

After coating, the example materials were slit into 5 cm wide by 20 meter long tape rolls wound onto a 2.5 cm diameter cardboard core. The tape rolls were placed into a 50° oven for up to 31 weeks heat aging in order to measure tape roll unwind force and compared to a commercially available adhesive coated nonwoven tape (3M™ Medipore™ 2962). Sample strips were also cut to measure peel adhesion (initial and after 96 bake cycles). The peel adhesion and tape roll unwind data are given in Table 8.

TABLE 8

| Example | Unwind Force (kg/m) | | | Peel Adhesion (initial) (kg/m) | Peel Adhesion (96 cycles) (kg/m) |
|---|---|---|---|---|---|
|  | 14 weeks | 24 weeks | 31 weeks | | |
| NW-1 | 29.8 | 31.5 | 33.1 | 11.2 | 35.9 |
| NW-2 | 23.0 | 31.2 | 33.9 | 17.8 | 50.7 |
| NW-3 | 19.7 | 22.3 | 22.3 | 14.6 | 31.4 |
| NW-4 | 20.3 | 22.9 | 16.0 | 14.9 | 28.7 |
| NW-5 | 24.0 | 27.5 | 30.2 | 11.8 | 24.1 |
| NW-6 | 28.2 | 29.8 | 31.3 | 15.4 | 31.2 |
| NW-7 | 16.8 | 18.3 | 18.7 | 13.7 | 17.5 |
| NW-8 | 16.6 | 18.4 | 19.9 | 14.6 | 18.5 |
| NW-9 | 16.9 | 17.3 | 15.3 | 13.1 | 23.3 |
| 3M™ Medipore™ 2962 | 58.1 | 60.8 | 65.7 | 28 | >175 |

The adhesive coating weight does not affect peel and unwind for either of the two adhesives, although the LAB coating does. In this case the reduced peel adhesion values may indicate some transfer of the release LAB coating to the adhesive surface, which is not desirable. Surprisingly, even without the release LAB coating the inventive materials demonstrate much lower unwind force compared to the similar commercially available material. Also surprisingly, the example rolls made without release LAB coatings but which included a reinforcing scrim layer demonstrate unwind forces as low as materials coated with the release LAB. Therefore these materials can be produced more efficiently, at a reduced cost and without using solvent of any kind. By comparison, the commercially available adhesive coated nonwoven material exhibits very high unwind force, which increases with thermal aging, and a very high peel adhesion measured after 96 cycles. The commercial material did not remove cleanly, and the peel forces encountered exceeded the instrument's load capacity.

In an embodiment, the adhesives are crosslinked by exposure to ultraviolet irradiation. Table 8 Example NW-2 exhibited high peel adhesion build at 96 cycles. This embodiment was therefore exposed to additional irradiation, using a higher energy UVC lamp. The additional dosage measured by dosimeter readings and its effect on peel adhesion forces measured after 96 bake cycles are given in Table 9.

TABLE 9

| UVC Dose (mJ) | Peel Adhesion (96 cycles) (kg/m) | Adhesive Transfer |
|---|---|---|
| 16 | 18.4 | − |
| 19 | 14.9 | ○ |
| 22 | 14.4 | + |
| 25 | 13.6 | + |
| 32 | 11.7 | + |
| 65 | 11.9 | + |

The peel adhesion after bake cycling and adhesive transfer both decrease with increasing UV exposure, allowing more desirable properties to be obtained.

Samples laminated adhesive side to adhesive side, using a 4.5 kg steel roller, were measured for T-Peel adhesion after 96 bake cycles. These constructions were made to compare the effect of LAB coating, if any, and scrim placement, if any, on T-Peel adhesion. The results are in Table 10. Example NW-12 with the scrim partially embedded into the top layer of the adhesive exhibits the lowest T-peel adhesion build and lowest roll unwind after aging. Without any scrim layer, a very heavy LAB coat of 150% drive is required to produce the same T-peel values. Low unwind and low T-peel adhesion values are desirable for ease of use, especially of large rolls of greater than 20 cm in width. It is desirable to use large width rolls to most efficiently protect the large surface area of a typical paint booth.

TABLE 10

| | | T-Peel Adhesion (96 cycles) (kg/m) | | |
|---|---|---|---|---|
| Example | Scrim | No LAB | LAB 100% | LAB 150% |
| NW-10 | None | 26.9 | 15.4 | 8.4 |
| NW-11 | Internal | 32.9 | 32.7 | 19.3 |
| NW-12 | Top | 11.8 | 11.5 | 7.3 |

A different nonwoven material (Example 4 nonwoven, Table 1) was coated at higher coating weight and crosslinked to evaluate the effect of scrim layer placement on peel adhesion and transfer. The results are shown in Table 11.

TABLE 11

| Example | Coat Wt (grams/meter$^2$) | Scrim | Peel Adhesion (Initial) (kg/m) | Peel Adhesion (96 cycles) (kg/m) | Adhesive Delamination (kg/m) | Adhesive Transfer (96 cycles) |
|---|---|---|---|---|---|---|
| NW-13 | 46 | Internal | 19.7 | 46.5 | 52.7 | o |
| | | Top | 5.9 | 10.8 | 17.1 | + |
| NW-14 | 37 | Internal | 15.6 | 34.0 | 47.2 | o |
| | | Top | 3.7 | 5.7 | 13.0 | + |

Placement of the reinforcing scrim layer has a significant effect on peel adhesion and adhesive transfer. When the scrim is embedded into the top portion of the adhesive layer, the peel adhesion is low and does not build very much with bake cycling. In addition, this placement limits or eliminates any adhesive transfer. The force required to cause delamination of at least part of the product when adhered to a high surface energy anodized aluminum surface exhibits a sharp decrease compared to the example with the scrim layer internally disposed. In this case, however, the majority of the adhesive remains with the nonwoven material backing, and the force required to peel away the partially embedded scrim layer from the adhesive surface is reported.

This arrangement may be preferred, for example, for lining the floor of an industrial paint booth in which the material is subjected to loading by having vehicles parked on top of it during the spraying and baking operations. Less adhesion is required to hold the material in place, and it is desirable to remove the product cleanly without adhesive transfer. For other arrangements, for example, lining the wall of a paint booth, higher levels of peel adhesion are desired and there is no weight loading during normal booth operations; in this case, it is acceptable to have a build in peel adhesion so long as the adhesive delamination force is at least the same or greater than the peel adhesion force after 96 bake cycles.

8. Performance Evaluation of Example Materials

A. Scanning Electron Microscopy (SEM)

Figure 6:
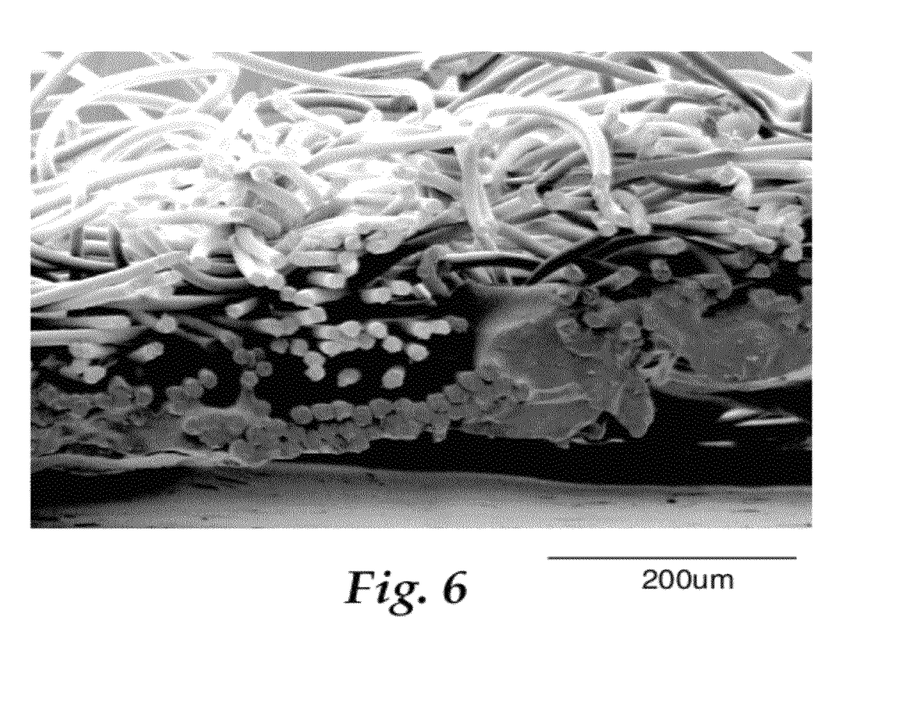
FIG. 6 is a scanning electron micrograph taken in the cross-section of an embodiment of the present disclosure.

FIG. 6 is a scanning electron micrograph taken of a cross-section of Example NW-7 which shows the adhesive material penetrating beyond the scrim layer and into the nonwoven layer, thereby at least partially encapsulating the scrim layer. This results in a bonding together of the structure's components and reinforcement of the adhesive layer.

Figure 7:
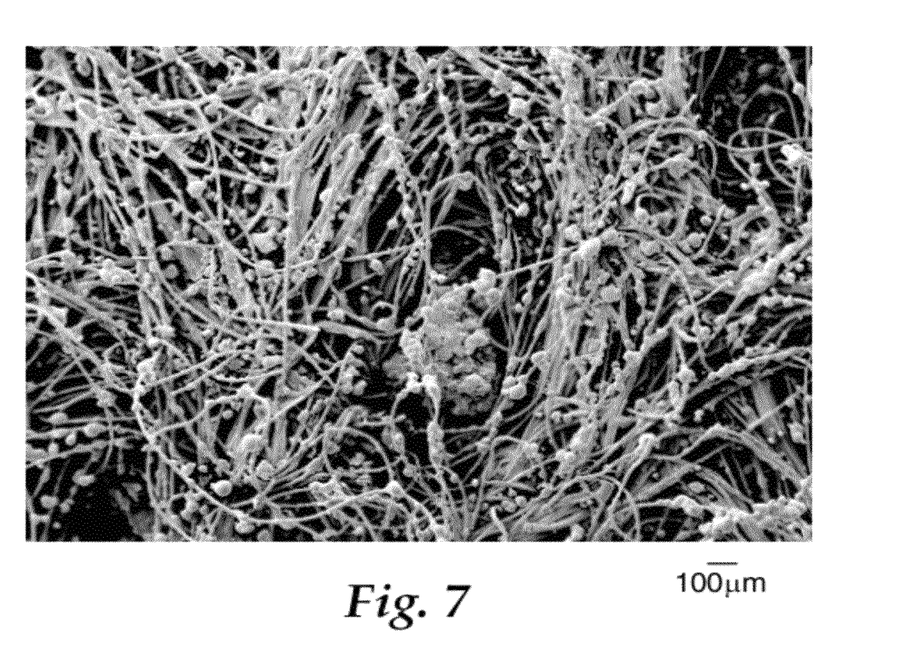
FIG. 7 is a scanning electron micrograph taken after two weeks exposure in a paint spray booth of the front surface of an embodiment of the present disclosure.

FIG. 7 is a scanning electron micrograph taken of the top surface of Example NW-7 of the present disclosure after being mounted on a vertical wall of a paint spray booth and exposed during painting operations for a period of two weeks. A large amount of particulate matter is found to be adhered to and/or embedded within the fibrous surface of the protective sheet of the present disclosure. Further, the particulates remain attached or embedded even when the protective sheet is torn away from the wall, indicating that the particulates and other contaminants are effectively immobilized within the protective material. Closer observation of FIG. 7 indicates that the majority of particulate contaminants are less than about 50 micrometers in diameter, which is the particulate size range thought to cause paint defects in typical paint spray operations.

B. Defect and Defect Remediation Measurement

The inventive concepts NW-3 (no scrim) and NW-14 (internal scrim) were installed in two paint booths and left in place for periods of two and four weeks and a similar number of paint jobs. This was compared to the same booths for a two-week period with no protective covering installed. The number of defects (also called 'nibs') per typical panel painted, and the time spent in removing defects by buffing per typical panel painted, were measured by stopwatch. In addition, the material was re-applied to one of the test booths after the initial four week period and evaluated after an additional two weeks. The results are given in Table 12:

TABLE 12

| | DEFECT REDUCTION | | | |
|---|---|---|---|---|
| Paint Booth | Covering | Weeks | Time/Panel (min) | Defects/panel |
| A | None | 4 | 11.5 | 14.9 |
| | Example 3 | 2 | 6.1 | 6.3 |
| | | 4 | 4.7 | 4.7 |
| | Reapply Example 3 | 4 | 2.6 | 2.2 |
| | Example NW-14 | 4 | 4.1 | 3.6 |
| B | None | 4 | 12.1 | 13.6 |
| | Example 3 | 2 | 7.4 | 9.9 |
| | | 4 | 7.1 | 10.7 |
| | Example NW-14 | 4 | 7.4 | 8.8 |

The number of defects is reduced by use of the inventive concept as well as the time spent in remediation of paint defects, by up to about 50%. Further, the lower number of defects and remediation time continue to decrease through a 4 week period. The level of defects drops even further when a fresh protection sheet is reapplied to one paint booth (A). These data suggest that the inventive materials can actively aid in reducing contaminants and immobilize overspray based particulates in typical paint booths.

C. Paint Holdout

Figure 8:
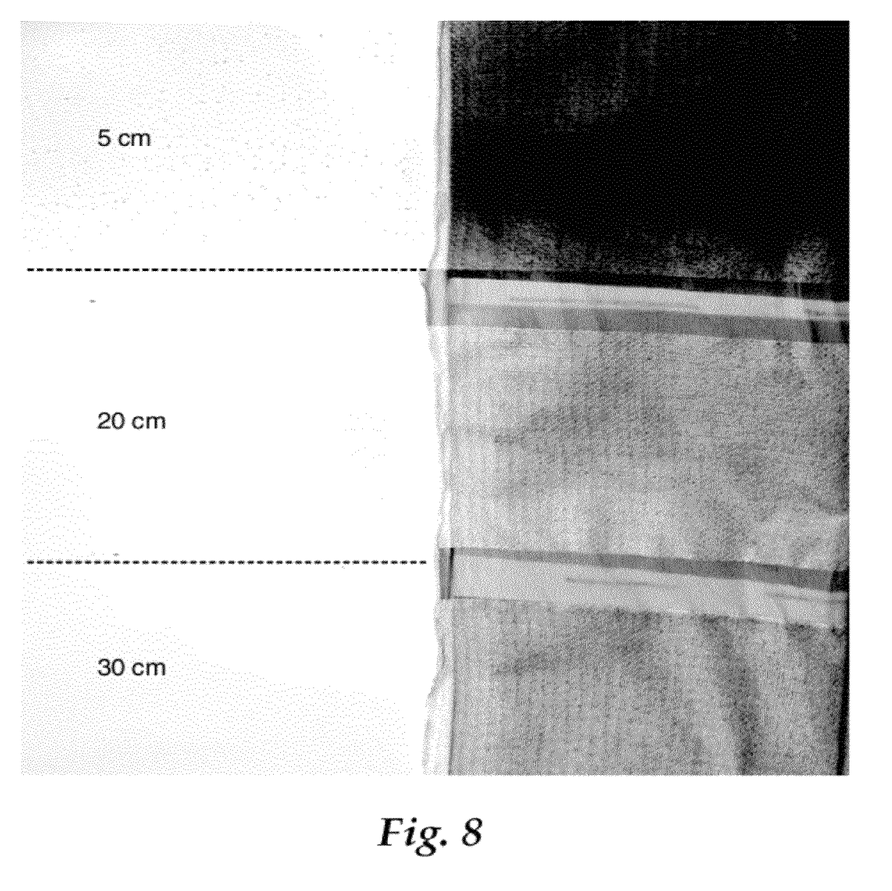
FIG. 8 is a photograph of the paint holdout capability in one embodiment of the present disclosure.

Example NW-14 was adhered to a 900 cm by 450 cm sheet of paper-faced foam core and exposed to black automotive paint spray using an HPLV spray gun using 40 psig air pressure. The spray gun nozzle was held at 5 cm, 20 cm, and 30 cm distance from the surface of the test material and the spray activated for 5 seconds. FIG. 8 is a photograph of the experimental assembly with the Example material peeled back from the foam core sheet. From top to bottom the spray distances were 5 cm, 20 cm and 30 cm. The top portion, exposed at 5 cm, exhibits only very slight bleed-through of the spray paint. The other portions at 20 cm and 30 cm exhibit no evidence of paint bleed-through. Although both the nonwoven and the scrim material have open structures, as evidenced in FIG. 6, the combination with adhesive effectively holds out paint, even using a direct spray.

What is claimed is:

1. A method of protecting a work surface comprising the steps of:
    (a) providing at least one protection sheet comprising
        (i) a nonwoven material having opposing first and second major surfaces;
        (ii) a pressure sensitive adhesive, disposed on the second major surface of the nonwoven material; and
        (iii) a scrim material in contact with at least a portion of the pressure sensitive adhesive, wherein the scrim material is partially embedded in the pressure sensitive adhesive such that the scrim material is disposed between the pressure sensitive adhesive and the second major surface of the nonwoven material and at least a portion of scrim material extends above the surface of the pressure sensitive adhesive such that a portion of the scrim material is substantially free from adhesive and exposed at the top surface of the protection sheet; and
    (b) adhering the at least one protection sheet to a substrate to be protected.

2. The method of claim 1, wherein adhering the at least one protection sheet to the substrate comprises applying sufficient pressure to protection sheet to bring the pressure sensitive adhesive surface in contact with the substrate.

3. The method of claim 1, wherein the nonwoven material comprises fibers selected from the group consisting of polyester, rayon, polyolefin, cotton, and blends thereof.

4. The method of claim 3, wherein the nonwoven material comprises polyester fibers.

5. The method of claim 1, wherein the nonwoven material comprises a material taken from the group consisting of: spun laced fibers, spunbond fibers, melt blown fibers, and thermal bonded fibers.

6. The method of claim 1, wherein the pressure sensitive adhesive is selected from the group consisting of acrylate polymers, natural and synthetic rubbers, silicone polymers, polyurethanes, polyolefins, poly (vinyl ethers) and styrene block copolymers.

7. The method of claim 1, wherein protection sheet comprises a second scrim material.

8. The method of claim 1, wherein the scrim material comprises woven polyester fibers.

9. The method of claim 1, wherein the scrim material has less than 50 threads in the warp direction for every 30 threads in the fill direction.

10. The method of claim 9, wherein the scrim material has less than 30 threads in the warp direction for every 15 threads in the fill direction.

11. The method of claim 1, wherein protection sheet further comprises an optical brightener.

12. The method of claim 1, wherein protection sheet is wound in a roll and adhering the at least one protection sheet to a substrate comprises dispensing protection sheet from the roll.

13. The method of claim 12, wherein the roll is perforated to facilitate removal and use.

14. The method of claim 1, wherein protection sheet further comprises a low adhesion backsize disposed on the first major surface of the nonwoven material.

15. The method of claim 1, wherein the layer of pressure sensitive adhesive has a coat weight of at least 10 grams/meter2.

16. The method of claim 15, wherein the pressure sensitive adhesive is crosslinked.

17. The method of claim 1, wherein protection sheet has a peel adhesion of less than 25 kg/meter after ninety-six, 30 minute bake cycles at 180° C.

18. The method of claim 1, wherein protection sheet has a particulate retention of at least 20%.

19. The method of claim 1, wherein protection sheet has an adhesive transfer of less than 25% after ninety-six, 30 minute bake cycles at 180° C.

* * * * *